(12) United States Patent
Buer et al.

(10) Patent No.: US 9,594,917 B2
(45) Date of Patent: Mar. 14, 2017

(54) SECURED MULTI-DIRECTIONAL, MULTI-INTERFACE TRANSACTION PROCESSING

(71) Applicant: NXP B.V., Eindhoven (NL)

(72) Inventors: Mark Buer, Payson, AZ (US); Mohamed Awad, Ladera Ranch, CA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 13/930,604

(22) Filed: Jun. 28, 2013

(65) Prior Publication Data
US 2015/0007335 A1  Jan. 1, 2015

(51) Int. Cl.
| | | |
|---|---|---|
| G06F 7/04 | (2006.01) | |
| G06F 17/30 | (2006.01) | |
| H04N 7/16 | (2011.01) | |
| G06F 21/60 | (2013.01) | |
| G06F 21/74 | (2013.01) | |
| G06Q 20/32 | (2012.01) | |

(52) U.S. Cl.
CPC .......... *G06F 21/606* (2013.01); *G06F 21/74* (2013.01); *G06Q 20/322* (2013.01); *G06Q 20/3278* (2013.01); *G06Q 20/327* (2013.01)

(58) Field of Classification Search
CPC .......... G06Q 20/322–20/3229; G06Q 20/327; G06Q 20/3278
See application file for complete search history.

(56) References Cited

U.S. PATENT DOCUMENTS

| | | | |
|---|---|---|---|
| 8,559,987 B1 * | 10/2013 | Fisher | G06Q 20/20 235/380 |
| 8,706,081 B1 * | 4/2014 | Paya | H04M 1/7253 455/41.1 |
| 2013/0060959 A1 * | 3/2013 | Taveau et al. | 709/232 |
| 2013/0073448 A1 * | 3/2013 | Wall | G06Q 20/367 705/39 |
| 2013/0317927 A1 * | 11/2013 | Bush | G06Q 20/3278 705/21 |
| 2014/0244513 A1 * | 8/2014 | Ballesteros | G06Q 20/382 705/64 |
| 2014/0256251 A1 * | 9/2014 | Caceres | H04B 5/0031 455/41.1 |

OTHER PUBLICATIONS

Langer et al., "Secure Element Development," Near Field Communication Research Lab Hagenberg, Oulu Developers Summit, Sep. 4, 2009.
Galla, Francesco, "NFC Tags—A technical introduction, applications and products," NXP Semiconductors, Rev. 1.3, Dec. 1, 2011.

* cited by examiner

*Primary Examiner* — Daniel Potratz (57) ABSTRACT

Embodiments of the present disclosure describe an apparatus, method, and computer readable medium for processing a secure transaction. One embodiment describes an apparatus comprising: a processor; a secure element coupled to the processor; and a connectivity device coupled to the secure element, and configured to exchange communications with a device that is external to the apparatus, and receive and execute one or more unsolicited commands from the secure element.

20 Claims, 7 Drawing Sheets

SECURED MULTI-DIRECTIONAL, MULTI-INTERFACE TRANSACTION PROCESSING

BACKGROUND

Field

Embodiments of the present disclosure relate generally to processing secure transactions.

Background

Conducting transactions electronically is becoming more common, especially conducting transactions from a mobile device. For example, a conventional mobile device (such as a mobile telephone, laptop computer, tablet computer, and the like) may be capable of sending and receiving electronic payments. Sharing sensitive or confidential information—such as credit card information, bank account and routing information, and the like—is often required to process an electronic payment.

In some situations and environments, certain components of a conventional mobile device (such as a processor) may not be secure; that is, they may be compromised by a computer virus or a hacker. In these situations and environments, any sensitive or confidential information exchanged during the transaction may be exposed, intercepted, and subsequently used maliciously and without authorization.

DETAILED DESCRIPTION OF EXAMPLE EMBODIMENTS

While the present disclosure is described herein with illustrative embodiments for particular applications, it should be understood that the disclosure is not limited thereto. A person skill in the art with access to the teachings provided herein will recognize additional modifications, applications, and embodiments within the scope thereof and additional fields in which the disclosure would be of significant utility.

The terms "embodiments" or "example embodiments" do not require that all embodiments include the discussed feature, advantage, or mode of operation. Alternate embodiments may be devised without departing from the scope or spirit of the disclosure, and well-known elements may not be described in detail or may be omitted so as not to obscure the relevant details. In addition, the terminology used herein is for the purpose of describing particular embodiments only and is not intended to be limiting. For example, as used herein, the singular forms "a," "an" and "the" are intended to include the plural forms as well, unless the context clearly indicates otherwise. It will be further understood that the terms "comprises," "comprising," "includes" and "including," when used herein, specify the presence of stated features, integers, steps, operations, elements, and components, but do not preclude the presence or addition of one or more other features, integers, steps, operations, elements, components, or groups thereof.

Figure 1:
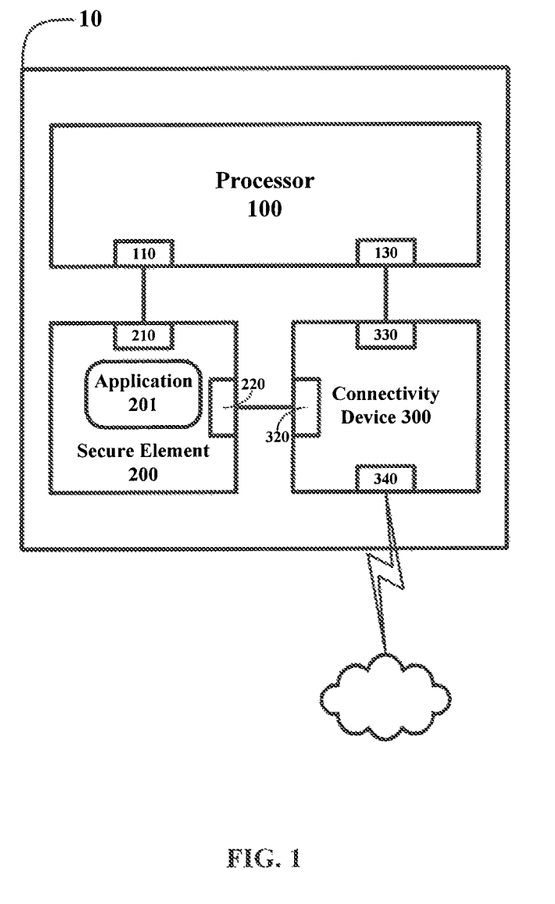
FIG. 1 illustrates an example apparatus for processing a secure transaction.

FIG. 1 illustrates an example apparatus 10 for processing a secure transaction. The apparatus 10—as well as each of the apparatuses depicted in FIGS. 1-6 (i.e., 10, 20, 30a, 30z, 40, 50, and 60)—may be any computing device including, but not limited to, a mobile computing device (such as a laptop computer, a tablet computer, a mobile telephone or smartphone, a "phablet," a personal digital assistant (PDA), and the like), a wearable computing device (such as a wrist watch or "smart" watch, computerized eyeglasses, an identification badge or device, and the like), and a stationary computing device (such as a personal computer (PC), a desktop computer, cash register, smartcard reader, automated teller machine (ATM), computerized kiosk, and the like).

Some or all of the components of the apparatuses depicted in FIGS. 1-6 (i.e., 10, 20, 30a, 30z, 40, 50, and 60) may be implemented in the same integrated circuit or in different integrated circuits. For example, and with reference to the apparatus 10 of FIG. 1, the processor 100, the secure element 200, and the connectivity device 300 may each be implemented in the same integrated circuit; or the secure element 200 and the connectivity device 300 may be implemented in the same integrated circuit, and the processor 100 in a different integrated circuit; or the processor 100 and the connectivity device 300 may be implemented in the same integrated circuit, and the secure element 200 in a different integrated circuit; or the processor 100, the secure element 200, and the connectivity device 300 may each be implemented in different integrated circuits. Also, as should be apparent to a person skilled in the art, other components may be included in the apparatuses depicted in FIGS. 1-6, but may not necessary be required to achieve some or all of the aspects of this disclosure.

The apparatus 10 of FIG. 1 includes a processor 100, a secure element 200, and a connectivity device 300. The processor 100 is communicatively coupled to the secure element 200 and to the connectivity device 300, and includes interfaces 110 and 130 to communicate with the secure element 200 and the connectivity device 300, respectively. The processor 100 may be any processing device, including, but not limited to, a general purpose processor, a central processing unit (CPU), a microprocessor, an application-specific instruction set processor, and the like.

The secure element 200 of FIG. 1 is communicatively coupled to the processor 100 and to the connectivity device 300, and includes interfaces 210 and 220 to communicate with the processor 100 and the connectivity device 300, respectively. The secure element 200 of FIG. 1 includes hardware, software, or a combination of hardware and software for interfacing and communicating with the processor 100 and the connectivity device 300, and for securely processing transactions. All software described throughout this disclosure may be embodied as one or more instructions on a non-transitory computer readable medium.

In some example embodiments, the secure element 200 is an integrated circuit or chip that is embedded in a printed circuit board (PCB)—such as a motherboard, mainboard, logic board, and the like—along with other components of the apparatus 10. In other embodiments, the secure device 200 is disposed in a subscriber identity module or subscriber identification module (SIM) that can be coupled to and communicate with the apparatus 10 via an interface. In yet other embodiments, the secure element 200 is disposed in a secure digital (SD) card that can be coupled to and communicate with the apparatus 10 via an interface. In some of these example embodiments the secure element 200 is implemented as a smartcard chip, and communicates with other components by sending and receiving one or more application protocol data units (APDUs).

In FIG. 1, the secure element 200 includes the application 201—which, because it is executed on the secure element 200, may be referred to as a "secure application." The application 201—which may be an applet, or any other set of executable instructions—may be activated by the secure element 200 to process a transaction, such as a secure transaction. Financial transactions (such as sending or receiving a payment), personal identification, the exchange of sensitive or confidential information (such as exchanging personal contact information, or personal medical information), and the establishment of a secure communication channel (or link) are non-limiting examples of secure transactions. Also, while illustrated as a single application in FIG. 1, it should be apparent to one of ordinary skill in the art that the application 201 may represent plural applications, applets, and the like.

In some example embodiments, the secure element 200 includes an application for each "type" of transaction that may be conducted by the secure element 200. For example, the secure element 200 may include a first application for processing secure financial transactions, a second application for the secure exchange of sensitive or confidential information, and a third application for establishing a secure communication channel. In these or other embodiments, the secure element 200 may include an application for each vendor, party, or device that the apparatus 10 conducts a transaction with. For example, the secure element 200 may include a first application for conducting a secure financial transaction with a first banking institution, and a second application for conducting a secure financial transaction with a second banking institution.

In some situations and environments, such as a mobile computing environment, the processor 100 may not be trusted or secure—it may be compromised by a computer virus or a hacker, and any sensitive or confidential information used by the processor 100 may be exposed. Thus, in some example embodiments, the secure element 200 includes all necessary hardware (e.g., processor, memory, etc.) and software to process a secure transaction without requiring the processor 100 (or any other component) to process any of the transaction. That is, in these embodiments, the entire transaction is processed by the secure element 200; as opposed to processing part or all of the transaction at the processor 100 (or any other component). As an example, the secure element 200 receives a request from either the processor 100 or the communication device 300 to process a secure transaction. In this example, the secure element 200 identifies the type of transaction requested, and activates an appropriate application residing on the secure element 200 (such as application 201), which processes the transaction. This example illustrates that, while the secure element 200 may communicate with the processor 100 or the communication device 300 (or both) to obtain information regarding a transaction, the entire transaction may be processed by the secure element 200.

Turning again to FIG. 1, the connectivity device 300 is communicatively coupled to the processor 100 and to the secure element 200. The connectivity device 300 includes interfaces 320 and 330 to communicate with the secure element 200 and the processor 100, respectively. The connectivity device 300 also includes interface 340 for interfacing and communicating with one or more external devices. As such, the connectivity device 300 includes hardware, software, or a combination of hardware and software for interfacing and communicating with the processor 100, the secure element 200, and one or more external devices. In some example embodiments—such as the embodiment depicted by FIG. 2 (described below)—an apparatus for processing a secure transaction includes more than one connectivity device.

The connectivity device 300 of FIG. 1 may be any device for sending and receiving communications—wired or wireless—to and from the apparatus 10. Examples of the connectivity device 300—as well as each of the connectivity devices depicted in FIGS. 1-6 (i.e., 300, 300a, 300b, 300n, and 300z)—include, but are not limited to, a near field communication (NFC) device, a Bluetooth communication device, a wireless local area network (WLAN) communication device, a cellular or other radio frequency (RF) communication device, a satellite communication device, an infrared communication device, and the like.

As mentioned, the interfaces 320, 330, and 340 of the connectivity device 300 allow the connectivity device 300 to communicate with the secure element 200, the processor 100, and one or more external devices, respectively. In some example embodiments, the secure element 200 may generate and send an unsolicited communication, including an unsolicited command or instruction, to the connectivity device 300. In these embodiments, the connectivity device 300 receives—via interface 320—the unsolicited communication from the secure element 200, parses the unsolicited communication to identify the unsolicited command, and executes the unsolicited command. Here, the communication and the embedded command may be considered "unsolicited" because the connectivity device 300 did not request the communication from the secure element 200; that is, the secure element 200 initiated the communication with the connectivity device 300. In these embodiments, it may be said that the connectivity device 300 (or the interface 320) "listens to" and responds to secure element 200. The connectivity device 300 may "listen to" and respond to the processor 100 and one or more external devices in a similar manner. Also, the processor 100 may "listen to" and respond to the secure element 200 in a similar manner.

Each of the interfaces 110, 130, 210, 220, 320, 330, and 340 of FIG. 1 may be implemented in hardware, software, or a combination of hardware and software. Also—as should be apparent to one of ordinary skill in the art—the processor 100, secure element 200, and connectivity device 300 may include other interfaces for coupling to and communicating with devices, circuits, chips, components, and the like other than those shown in FIG. 1.

To facilitate interaction among the elements (e.g., 100, 200, and 300) of FIG. 1, each element may provide an application programming interface (API) for the other elements to implement. For example, the connectivity device 300 provides an API that the secure element 200, or an application (such as application 201 of FIG. 4—described further below) executing on the secure element 200, implements so that the secure element 200 can interact with and exploit the functionality of the communication device 300. Likewise, the secure element 200 may provide an API that the processor 100, or an application (such as application 101 of FIG. 4—described further below) executing on the processor 100, implements so that the processor 100 can interact with and exploit the functionality of the secure element 200. Thus, each element of FIG. 1 may be able to communicate in a format compatible with each other element of FIG. 1.

Figure 2:
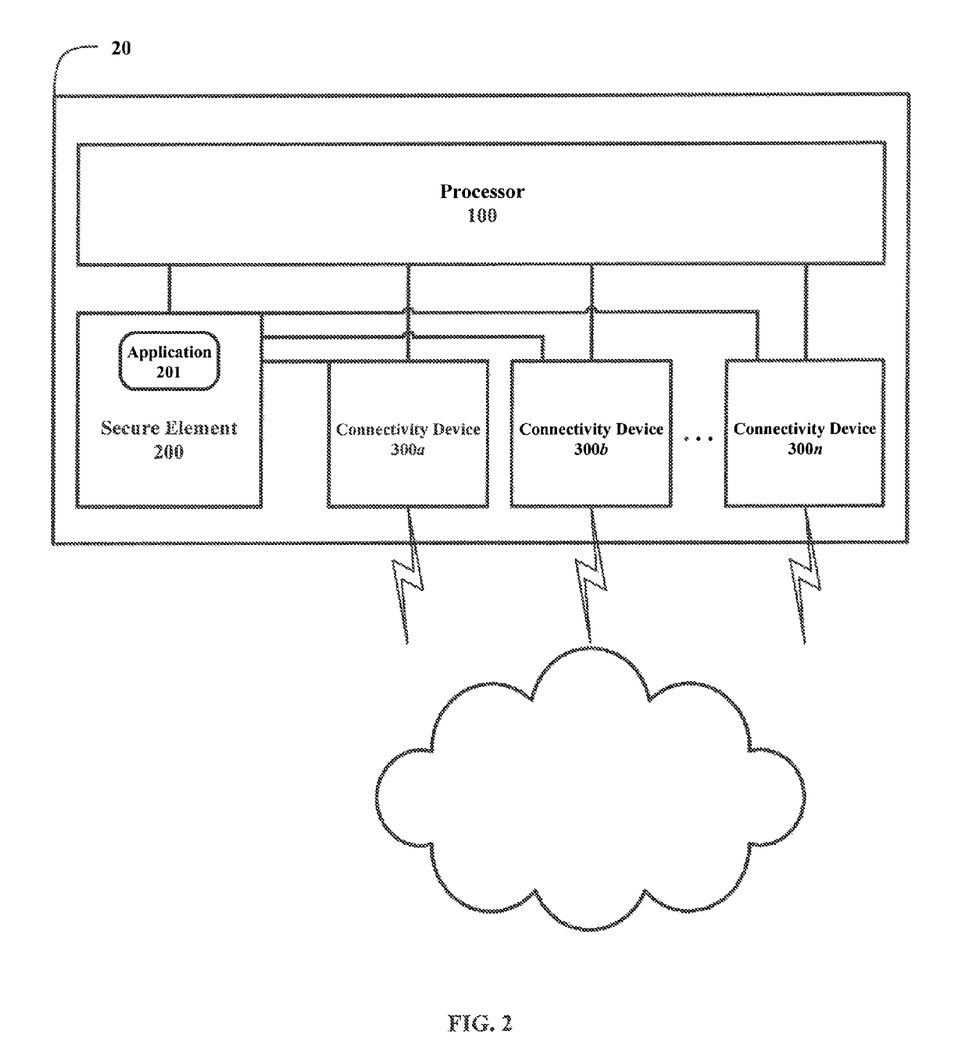
FIG. 2 illustrates an example apparatus for processing a secure transaction including plural connectivity devices.

As mentioned, an apparatus for processing a secure transaction may include plural connectivity devices. FIG. 2 illustrates an example apparatus 20 for processing a secure transaction that includes a processor 100 and a secure element 200 similar to those depicted and described in accordance with FIG. 1, but also includes plural connectivity devices 300a-300n. In FIG. 2, the connectivity devices 300a-300n may be the same type of connectivity device or different types of connectivity devices, and may communicate with other devices using the same or different communications protocols. For example, connectivity devices 300a-300n may all be NFC devices. As another example, connectivity device 300a may be a NFC device, connectivity device 300b may be a Bluetooth communication device, and connectivity device 300n may be a WLAN communication device.

Each of the connectivity devices 300a-300n in the apparatus 20 of FIG. 2 may couple to and communicate with the processor 100 and the secure element 200, and vice versa, as depicted and described in accordance with FIG. 1. The secure element 200 of FIG. 2 may include a single interface (such as interface 230 of FIG. 1) for communicating with the plural connectivity devices 300a-300n, or may include plural interfaces (such as one interface for each connectivity device) for communicating with the plural connectivity devices 300a-300n. Likewise, the processor 100 of FIG. 2 may include a single interface (such as interface 130 of FIG. 1) or plural interfaces (such as one interface for each connectivity device) for communicating with the plural connectivity devices 300a-300n.

Figure 6:
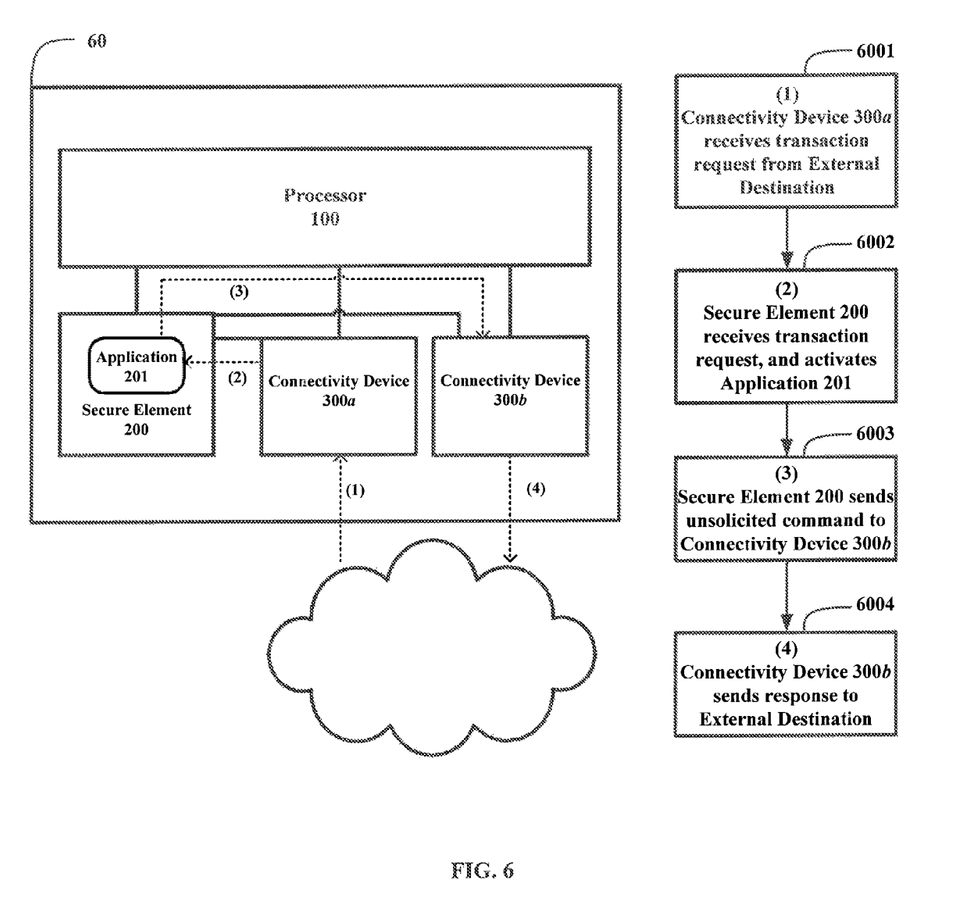
FIG. 6 illustrates an example method for processing a secure transaction where the illustrated apparatus operates in a "slave" mode or a "tag" mode to establish a communication channel.
Figure 7:
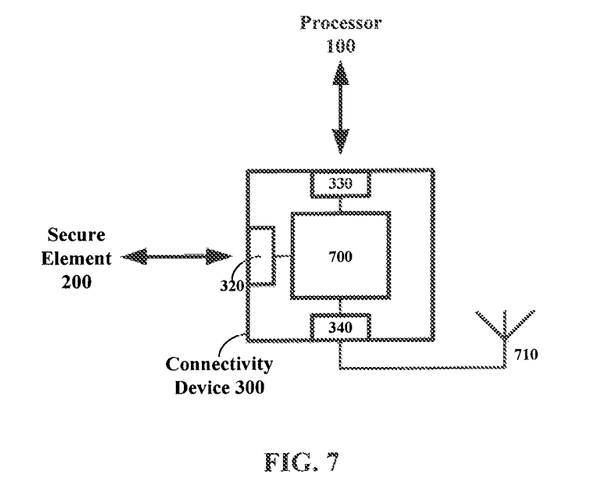
FIG. 7 illustrates an example connectivity device of an apparatus for processing a secure transaction.

FIG. 7 illustrates an example connectivity device of an apparatus for processing a secure transaction. The connectivity device 300 depicted in FIG. 7 may represent any of the connectivity devices depicted in FIGS. 1-6 (i.e., 300, 300a, 300b, 300n, and 300z), and may be disposed in any of the apparatuses depicted in FIGS. 1-6 (i.e., 10, 20, 30a, 30z, 40, 50, and 60). Like the connectivity device depicted in FIG. 1, the connectivity device of FIG. 7 includes interfaces 320, 330, and 340 that allow the connectivity device to communicate with the secure element 200, the processor 100, and one or more external devices, respectively.

In FIG. 7, the interface 320 may support communication with the secure element 200 via the single wire protocol (SWP) or a similar protocol. The interface 330 may support communication with the processor 100 via, for example, a high-speed bus, a high speed inter-chip (HSIC) bus, a universal serial bus (USB), a universal asynchronous receiver/transmitter (UART), a universal synchronous/asynchronous receiver/transmitter (USART), a peripheral component interconnect (PCI), a PCI express (PCIe), and the like. And, the interface 340 is coupled to an antenna 710 to send and receive wireless communications.

The connectivity device 300 of FIG. 7 also includes logic unit 700, which is coupled to the interfaces 320, 330, and 340. The logic unit 700 may be implemented in hardware, software, or a combination of hardware and software. In some embodiments, the logic unit 700 includes firmware. In FIG. 7, the logic unit 700 partially or completely controls the connectivity device 300 to function as described in relation to FIGS. 1-6.

Figure 8:
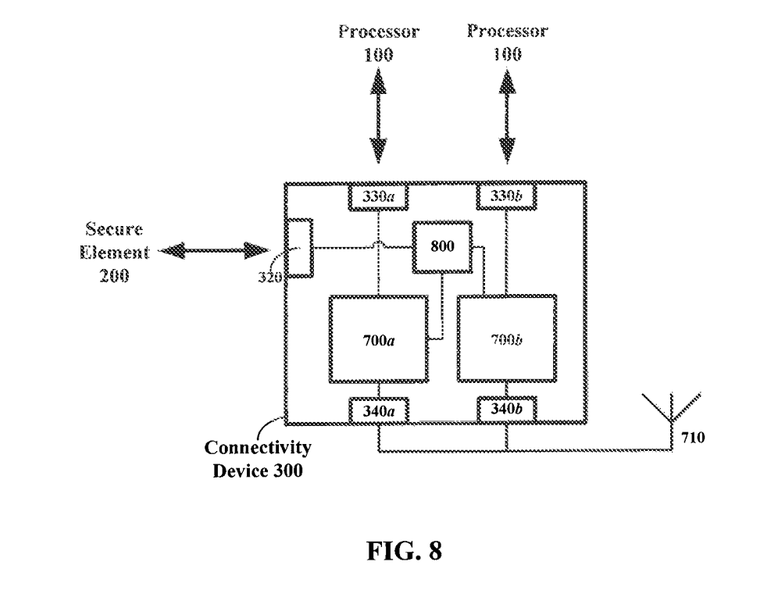
FIG. 8 illustrates an example connectivity device of an apparatus for processing a secure transaction.

FIG. 8 illustrates another example connectivity device of an apparatus for processing a secure transaction. The connectivity device 300 depicted in FIG. 8 may represent any of the connectivity devices depicted in FIGS. 1-6 (i.e., 300, 300a, 300b, 300n, and 300z), and may be disposed in any of the apparatuses depicted in FIGS. 1-6 (i.e., 10, 20, 30a, 30z, 40, 50, and 60). In some embodiments, the connectivity device 300 of FIG. 8 represents two or more of the connectivity devices 300a-300n of FIG. 3. The connectivity device of FIG. 8 includes some components like those described in relation to the connectivity device of FIG. 7, and, for brevity, a description of like components is not repeated.

The connectivity device 300 of FIG. 8 includes plural logic units, e.g., 700a and 700b, which ma implement the same or different communications protocols. For example, the logic unit 700a may implement WLAN communications, and the logic unit 700b may implement Bluetooth communications. The logic unit 700a is coupled to the interfaces 330a and 340a, for communicating with the processor 100 and one or more external devices, respectively. The logic unit 700b is coupled to the interfaces 330b and 340b, for communicating with the processor 100 and one or more external devices, respectively.

Both logic units 700a and 700b are coupled to a switch 800, which is coupled to the interface 320 for communicating with the secure element 200. In some embodiments, the switch 800 is a multiplexer. In FIG. 8, the switch 800 may selectively couple either the logic unit 700a or the logic unit 700b to the interface 320 for communicating with the secure element 200. In some embodiments, the switch 800 selectively couples more than two logic units to the interface 320. Thus, as should be apparent to a person skilled in the art, a connectivity device including more than two logic units (configured as depicted in FIG. 8) is within the scope of this disclosure.

Figure 3:
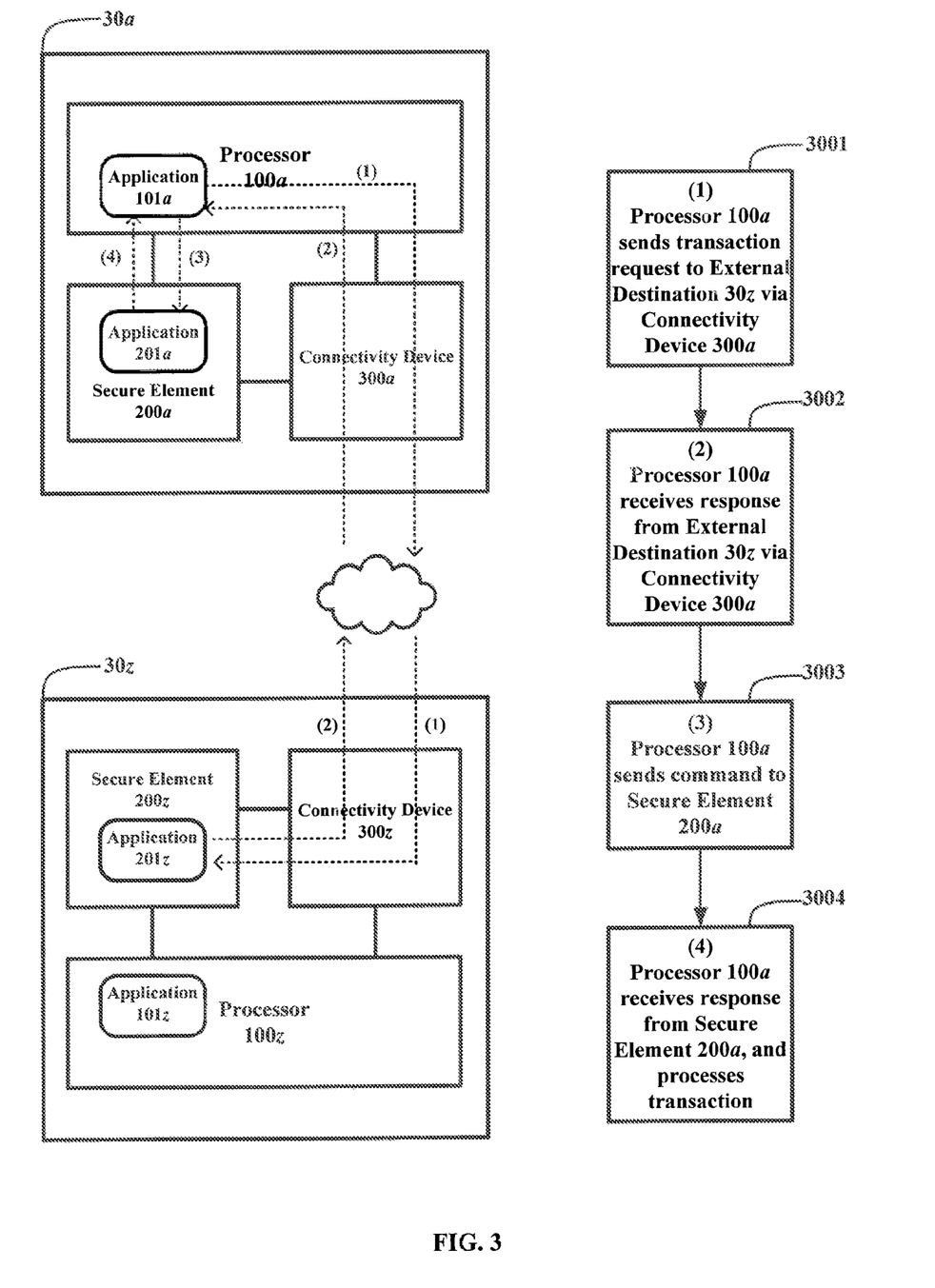
FIG. 3 illustrates an example method for processing a transaction.

Turning now to FIG. 3, an example method for processing a transaction is illustrated. FIG. 3 illustrates two apparatuses, i.e., 30a and 30z, conducting a transaction. Because the apparatus 30a initiates the transaction in FIG. 3, the pair 30a and 30z may be referred to as "master" and "slave" (respectively), or as "reader" and "tag" (respectively); however, the roles of the apparatuses 30a and 30z may be reversed without departing from the scope of the disclosure.

Turning to stage 3001, which corresponds to communication (1) of FIG. 3, the processor 100a of the apparatus 30a sends a transaction request to the external destination (apparatus) 30z via the connectivity device 300a. The transaction request may be generated by an application (e.g., application 101a) executing on the processor 100a, and the application may be used to process—in whole or in part—the transaction. The transaction request may be generated in response to user input, such as a user of the apparatus 30a interacting with an input device coupled to the apparatus 30a. As illustrated by the dotted line representing communication (1), the transaction request from the processor 100a is sent from the apparatus 30a via the connectivity device 300a. The secure element 200z of the apparatus 30z receives the transaction request via the connectivity device 300z, and may activate a secure application (e.g., application 201z) to generate a response to the transaction request.

At stage 3002, which corresponds to communication (2) of FIG. 3, the processor 100a receives a response from the external destination (apparatus) 30z via the connectivity device 300a. As illustrated by the dotted line representing communication (2), the secure element 200z transmits the response generated at stage 3001 via connectivity device 300z. The connectivity device 300a of the apparatus 30a receives the response, and communicates the response to the processor 100a.

At stage 3003, which corresponds to communication (3) of FIG. 3, the processor 100a of the apparatus 30a sends a command to the secure element 200a. The command may include a request for sensitive or confidential information, authentication of the information received from the apparatus 30z, instructions for processing a portion of the transaction, and the like. The secure element 200a receives the command, and may activate a secure application (e.g., application 201a) to generate a response to the command.

At stage 3004, which corresponds to communication (4) of FIG. 3, the processor 100a receives the response from the secure element 200a, and processes the transaction. As mentioned, a processor—such as the processor 100a—may not be trusted or secure in certain situations and environments. In the method of FIG. 3, if the processor 100a is compromised by a computer virus or a hacker, any sensitive or confidential information used by the processor 100a to process the transaction may be exposed, intercepted, and subsequently used maliciously and without authorization.

An example transaction illustrates the security risks posed by the method of FIG. 3. In this example, Zoey, the user of apparatus 30z, desires to purchase something from Alex, the user of the apparatus 30a. Alex may interact with a keyboard, barcode reader, or any other input device of the apparatus 30a to request an electronic payment from Zoey. The processor 100a receives the input (such as the purchase price), generates a request for payment (e.g., using application 101a), and transmits the request for payment to the apparatus 30z. Upon receiving the request, the secure element 200z may activate a secure electronic payment application (e.g., application 201z). In this example, the secure element 200z may store sensitive or confidential information about Zoey—such as Zoey's credit card information—and the electronic payment application may access the sensitive or confidential information and prepare a response containing that information.

The response containing Zoey's credit card information is transmitted from the secure element 200z (via the connectivity devices 300z and 300a) to the processor 100a. The processor 100a may command the secure element 200a to provide sensitive or confidential information about Alex—such as Alex's bank account and routing information—maintained by the secure element 200a. Upon receiving the command from the processor 100a, a secure application (e.g., application 201a) may gather the information and generate a response.

Next, the application 201a provides Alex's bank account and routing information to the processor 100a, which—having Zoey's credit card information and Alex's bank account and routing information—processes the transaction to complete the purchase. In this example, if the processor 100a is compromised by a computer virus or a hacker, Zoey's credit card information and Alex's bank account and routing information may be exposed, intercepted, and subsequently used maliciously and without authorization. This example transaction between Alex and Zoey illustrates the security risks associated with the transaction processing method of FIG. 3.

Figure 4:
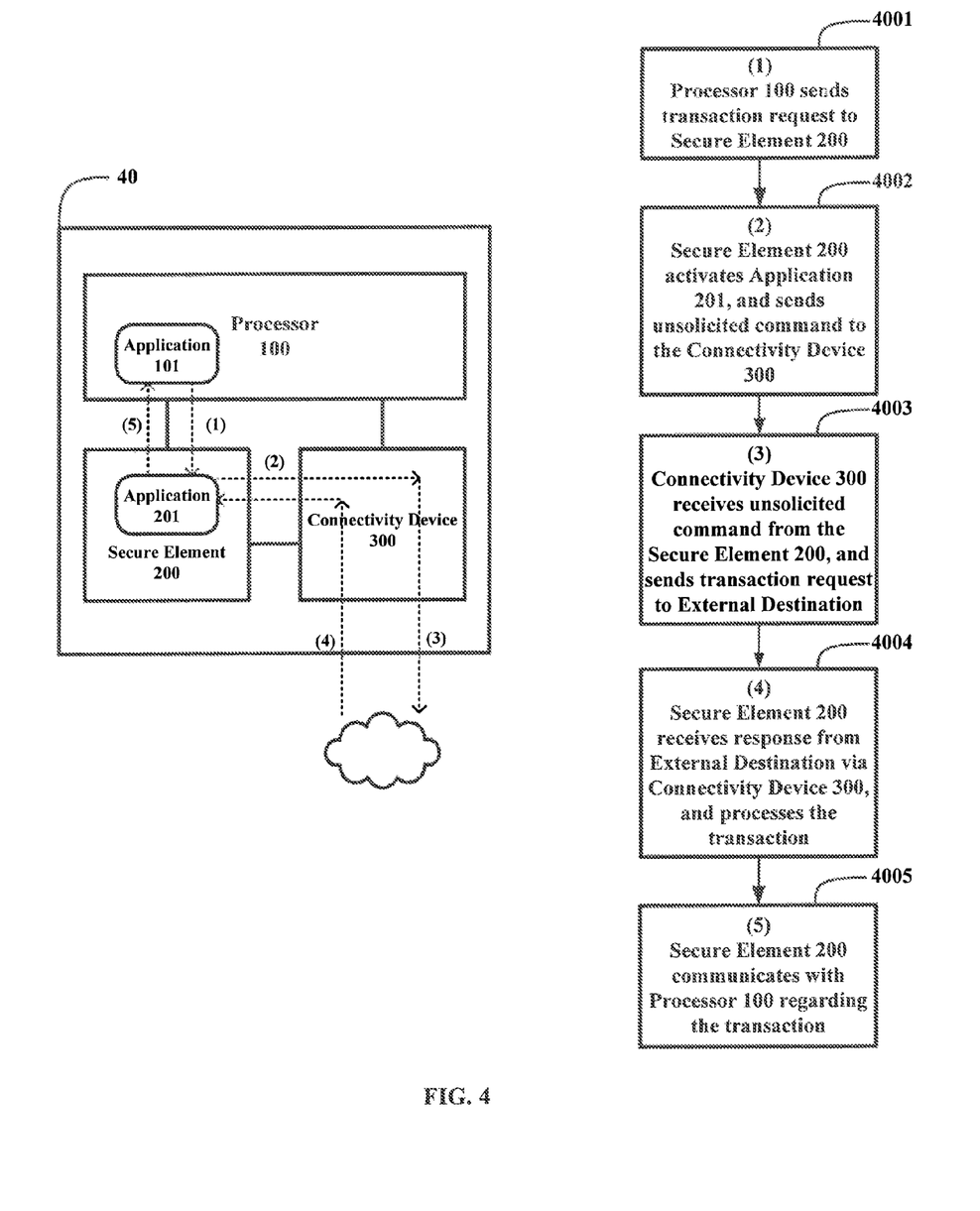
FIG. 4 illustrates an example method for processing a secure transaction where the illustrated apparatus operates in a "master" mode or a "reader" mode to process the secure transaction.
Figure 5:
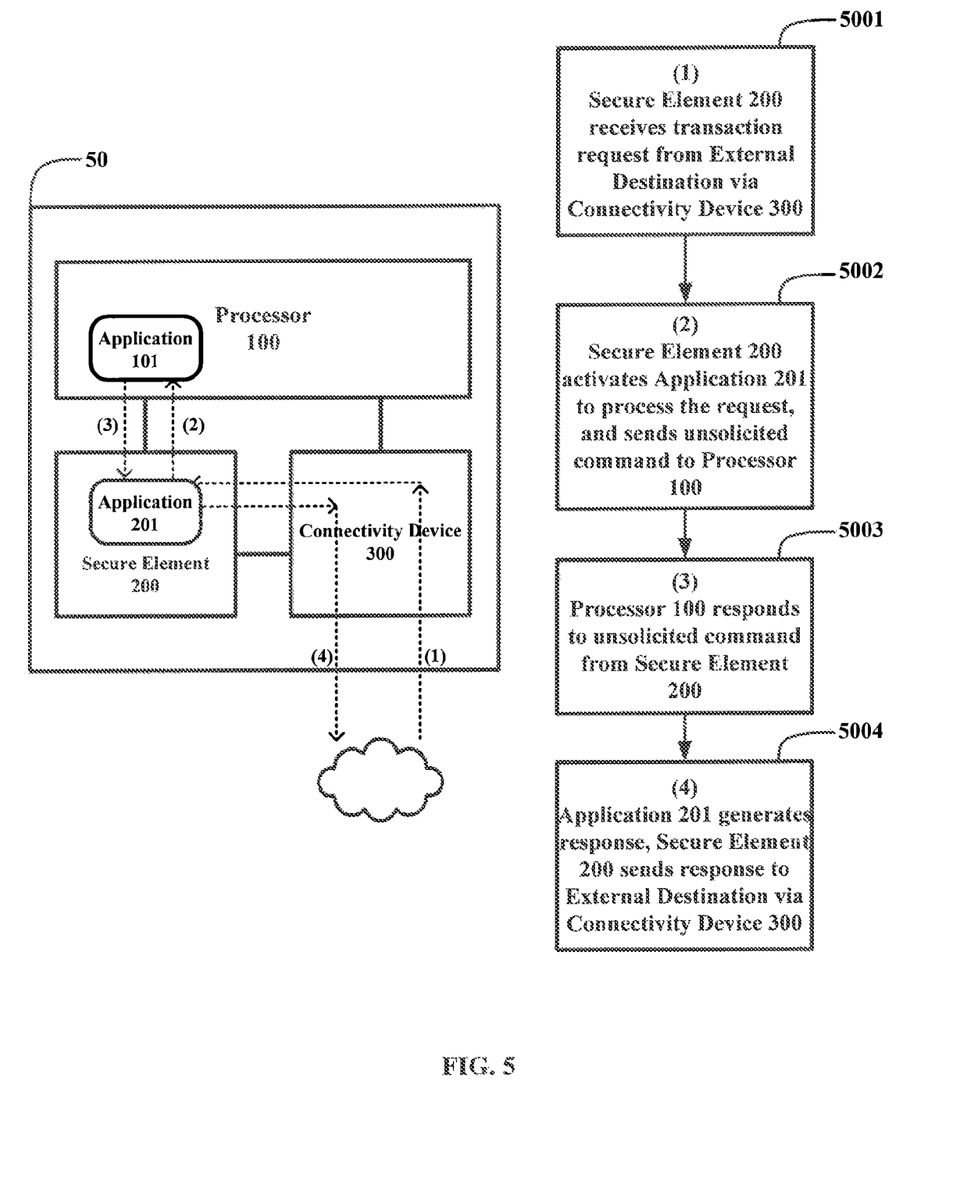
FIG. 5 illustrates an example method for processing a secure transaction where the illustrated apparatus operates in a "slave" mode or a "tag" mode to process and respond to a transaction request.

FIGS. 4-6 address these security risks, and illustrate example methods for processing a secure transaction. Considering FIGS. 4-6, each of the apparatuses 40, 50, and 60 may include all the features depicted and described in accordance with FIGS. 1 and 2.

Turning to FIG. 4, an example method of processing a secure transaction where the illustrated apparatus (i.e., apparatus 40) operates in a "master" mode or a "reader" mode is depicted. In this example method, the apparatus 40 initiates a secure transaction with an external destination or apparatus that may operate as a "slave" or a "tag." In some situations, the external destination or apparatus functions as described in accordance with the apparatus 30z of FIG. 3 or the apparatus 50 of FIG. 5 (described below).

At stage 4001, which corresponds to the communication (1) of FIG. 4, the processor 100 of the apparatus 40 sends a transaction request to the secure element 200. The transaction request may be generated by an application (e.g., application 101) executing on the processor 100, and may be generated in response to user input such as a user of the apparatus 30 interacting with an input device coupled to the apparatus 30. Here, the processor 100 communicates the transaction request to the secure element 200.

At stage 4002, which corresponds to communication (2) of FIG. 4, the secure element 200 activates the application 201, and sends an unsolicited command to the connectivity device 300. More specifically, upon receiving the transaction request in stage 4001, the secure element 200 may activate a secure application (e.g., application 201) to process the transaction. The secure application 201 may generate a communication, which may include a command instructing the connectivity device 300 to send a transaction request to the external destination. In stage 4002, the secure element 200 sends the communication to the connectivity device 300. Here, the communication and the embedded command may be considered "unsolicited" because the connectivity device 300 did not request the communication from the secure element 200; that is, the secure element 200 initiated the communication with the connectivity device 300. In some situations or embodiments, the communication sent by secure element 200 to the connectivity device 300 is an APDU.

At stage 4003, which corresponds to communication (3) of FIG. 4, the connectivity device 300 receives the unsolicited command from the secure element 200, and sends the transaction request to the external destination. As described above, the communication device 300 (or an interface of the communication device 300) may "listen" for an unsolicited communication from the secure element 200. And, upon receiving the unsolicited communication from the secure element 200, the connectivity device 300 parses the unsolicited communication to identify the unsolicited command, and executes the unsolicited command. In stage 4003, the unsolicited command instructs the connectivity device 300 to send a transaction request to the external destination.

At stage 4004, which corresponds to communication (4) of FIG. 4, the secure element 200 receives the response from the external destination via the connectivity device 300, and processes the secure transaction. In the method of FIG. 4, the external destination may function as described in accordance with the apparatus 30z of FIG. 3. And, as described in accordance with FIG. 3, the response from the external destination may include sensitive or confidential information retrieved from a secure element of the external destination. In stage 4004, the transaction may be processed by the secure application 201; thus, any sensitive or confidential information from the external destination (recall Zoey's credit card information from the example above), or maintained by the secure element 200 (recall Alex's bank account and routing information from the example above) are protected by the secure element 200 and not exposed by the processor 100.

At stage 4005, which corresponds to communication (5) of FIG. 4, the secure element 200 communicates with the processor 100 regarding the transaction. For example, the secure element 200 may notify the processor 100 that the transaction is processed, and the processor 100 may thereafter notify a user of the apparatus 40 (e.g., via an output device or the like) that the transaction has completed. Stage 4005 is optional, and in some embodiments is not required.

FIG. 5 illustrates an example method of processing a secure transaction where the illustrated apparatus (i.e., apparatus 50) operates in a "slave" mode or a "tag" mode. In this example method, the apparatus 50 processes and responds to a transaction request from an external destination or apparatus that may operate as a "master" or a "reader." In some situations, the external destination or apparatus functions as described in accordance with the apparatus 40 of FIG. 4 (described above).

At stage 5001, corresponding to communication (1) of FIG. 5, the secure element 200 receives a transaction request from an external destination via the connectivity device 300. As mentioned, the transaction request may seek sensitive or confidential information of the user or a party associated with the apparatus 50. This information may be stored or maintained by the secure element 200.

At stage 5002, corresponding to communication (2) of FIG. 5, the secure element 200 activates the application 201 to process the request, and sends an unsolicited command to the processor 100. In response to receiving the transaction request at stage 5001, the secure element 200 activates a secure application (e.g., application 201) to respond to the transaction request. The secure application 201 may gather information, including sensitive or confidential information, to satisfy the request. In some situations, the secure application 201 requires additional information, authorization to respond to the request, or both additional information and authorization from a device, entity, party, etc. outside of the secure element 200—such as a user of the apparatus 50. For example, an electronic payment request seeking payment over a certain amount may require authorization (e.g., entry of a personal identification number (PIN)) from the paying party.

In stage 5002, when it is necessary obtain information from outside of the secure element 200, the secure application 201 may generate a communication, which may include a command instructing the processor 100 to obtain and provide that information. The secure element 200 sends the communication to the processor 100. Here, the communication and the embedded command may be considered "unsolicited" because the processor 100 did not request the communication from the secure element 200; that is, the secure element 200 initiated the communication with the processor 100. In some situations or embodiments, the communication sent by secure element 200 to the processor 100 is an APDU.

At stage 5003, corresponding to communication (3) of FIG. 5, the processor 100 responds to the command from the secure element 200. As described above, the processor 100 (or an interface of the processor 100) may "listen" for an unsolicited communication from the secure element 200. And, upon receiving the unsolicited communication from the secure element 200, the processor 100 parses the unsolicited communication to identify the unsolicited command, and executes the unsolicited command. Here, the processor 100 may obtain and provide the information, authorization, or both that are required by the secure element 200 (and the secure application 201) to respond to the transaction request.

At stage 5004, corresponding to communication (4) of FIG. 5, the application 201 generates a response, and the secure element 200 sends the response to the external destination via the connectivity device 300. Upon receiving the information, authorization, or both from the processor 100 in stage 5003, the secure application 201 may generate a response to the transaction request, which is subsequently sent from the secure element 200 to the external destination via the connectivity device 300.

FIG. 6 illustrates an example method for processing a secure transaction where the illustrated apparatus (i.e., apparatus 60) operates in a "slave" mode or a "tag" mode to establish a communication channel or link. In some embodiments, the communication channel may be a secure communication channel.

At stage 6001, corresponding to communication (1) of FIG. 6, the connectivity device 300*a* receives a transaction request from an external destination. Here the transaction request may seek to establish a secure communication channel other than the communication channel carrying the transaction request. For example, the connectivity devices 300*a* and 300*b* of the apparatus 60 may be a NFC device and a WLAN communication device, respectively. In this example, the transaction request arrives via the NFC device, and seeks to establish a secure WLAN communication channel, or vice versa.

At stage 6002, corresponding to communication (2) of FIG. 6, the secure element 200 receives the transaction request via the connectivity device 300*a*, and activates the application 201 to respond to the transaction request. More specifically, upon receiving the transaction request in stage 6001, the secure element 200 may activate a secure application (e.g., application 201) to respond to and process the transaction.

In some embodiments, the secure element 200 or the secure application 201 includes one or more encryption keys that may be used to perform cryptography—such as public-key cryptography and private-key cryptography. Using these keys and cryptography techniques, the secure application 201 and an application at an external destination may encrypt all communications to increase the security of their communications. Also, the secure application 201 and an application at an external destination may use encryption keys to authenticate over a completely open communication channel—such as Bluetooth or WLAN—without concern over the security of the communication channel. For example, the secure application 201 and an application at an external destination may include pre-shared private keys. These private keys may be used to authenticate the source of communications between the secure application 201 and the application at the external destination. These cryptography and authentication techniques may also apply to the apparatuses and methods of FIGS. 4 and 5.

At stage 6003, corresponding to communication (3) of FIG. 6, the secure element 200 sends an unsolicited command to the connectivity device 300*b*. The secure application 201 may generate a communication, which may include a command instructing the connectivity device 300*b* to establish a communication link to an external device; the secure element 200 sends the communication to the connectivity device 300*b*. Here, the communication and the embedded command may be considered "unsolicited" because the connectivity device 300*b* did not request the communication from the secure element 200; that is, the secure element 200 initiated the communication with the connectivity device 300b. In some situations or embodiments, the communication sent by secure element 200 to the connectivity device 300b is an APDU.

At stage 6004, corresponding to communication (4) of FIG. 6, the connectivity device 300b sends a response to an external destination. As described above, the connectivity device 300b (or an interface of the connectivity device 300b) may "listen" for an unsolicited communication from the secure element 200. And, upon receiving the unsolicited communication from the secure element 200, the connectivity device 300b parses the unsolicited communication to identify the unsolicited command, and executes the unsolicited command. Here, the connectivity device 300b establishes a secure communication channel with an external destination. The external destination in stage 6004 may be the same as or different than the external destination in stage 6001. Consider again the example of establishing a secure WLAN communication channel (described in relation to stage 6001)—a NFC reader that sends a transaction request to the apparatus 60 may be disposed at a first physical location (e.g., a cash register), and a WiFi router to which the apparatus 60 establishes the secure WLAN communication channel may be disposed at a second physical location (e.g., a utility closet).

As should be apparent to one of skill in the art, the apparatus 60 of FIG. 6 may include any number of connectivity devices, and the secure element 200 may choose which connectivity device to send the command based on the transaction request. For example, the secure element 200 may send an unsolicited command to a Bluetooth communication device when the transaction request seeks a Bluetooth communication channel; a WLAN communication device when the transaction request seeks a WLAN communication channel; a cellular communication device when the transaction request seeks a cellular communication channel; and the like.

It is to be appreciated that the Detailed Description section, and not the Summary and Abstract sections, is intended to be used to interpret the claims. The Summary and Abstract sections may set forth one or more but not all example embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by one of ordinary skill in the art in light of the teachings and guidance.

The breadth and scope of the present disclosure should not be limited by any of the above-described example embodiments, but should be defined only in accordance with the following claims and their equivalents.

The claims in the instant application are different than those of other related applications. The Applicant therefore rescinds any disclaimer of claim scope made in any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against any other application.

What is claimed is:

1. An apparatus comprising:
a processor configured to execute an application;
a secure element coupled to the processor, and configured to receive sensitive information and to execute a secure application that resides in the secure element and that processes a transaction using the sensitive information while maintaining the sensitive information within the secure element and without exposing the sensitive information to the processor, wherein the application is configured to communicate with the secure application regarding the transaction but excluded from processing the transaction; and
a connectivity device coupled to the secure element, and comprising a first interface for receiving the sensitive information from a device that is external to the apparatus, and a second interface for transmitting the sensitive information to the secure element.

2. The apparatus of claim 1, wherein:
the secure element is further configured to receive a transaction request and to activate the secure application residing in the secure element in response to the transaction request, and
the secure application is configured to generate one or more unsolicited commands in response to the transaction request.

3. The apparatus of claim 2, wherein:
the secure application generates the one or more unsolicited commands in a format compatible with the connectivity device.

4. The apparatus of claim 2, wherein:
the processor is configured to generate and send the transaction request to the secure element, and
the secure application is further configured to receive the transaction request from the processor, and to generate and send one or more unsolicited commands to the connectivity device.

5. The apparatus of claim 2, wherein:
the connectivity device is configured to receive the transaction request from the device that is external to the apparatus via the first interface, and to send the transaction request to the secure application via the second interface, and
the secure application is further configured to generate and send one or more unsolicited commands to the processor.

6. The apparatus of claim 1, further comprising:
a second connectivity device coupled to the secure element,
wherein the connectivity device and the second connectivity device are configured to communicate using different communications protocols.

7. The apparatus of claim 6, wherein:
the connectivity device is further configured to receive a transaction request from the device external to the apparatus, and to send the transaction request to the secure element, and
the secure element is configured to establish a secure communication channel with the device external to the apparatus using the second connectivity device in response to receiving the transaction request from the connectivity device.

8. The apparatus of claim 1, wherein:
the secure element is implemented as an integrated circuit that is disposed in a subscriber identification module, disposed in a secure digital card, or embedded in a printed circuit board.

9. The apparatus of claim 1, wherein:
the connectivity device comprises at least one of a near field communication device, a Bluetooth communication device, a wireless local area network communication device, a cellular communication device, a satellite communication device, or an infrared communication device.

10. The apparatus of claim 1, wherein the second interface supports communication with the secure element via single wire protocol.

11. A method for executing a transaction in a mobile device comprising a processor and a secure element, comprising:
receiving, at the secure element, a transaction request to execute the transaction;
activating, at the secure element, a secure application configured to process the transaction in response to the transaction request;
receiving, at the secure element, sensitive information related to the transaction request;
processing, by the secure application, the transaction using the sensitive information while maintaining the sensitive information within the secure element and without exposing the sensitive information to the processor; and
executing, by the processor, an application that is configured to communicate with the secure application regarding the transaction but excluded from processing the transaction.

12. The method of claim 11, further comprising:
generating, at the processor, the transaction request; and
sending, from the processor, the transaction request to the secure element.

13. The method of claim 11, further comprising:
receiving, at a connectivity device disposed in the mobile device and coupled to the secure element, an unsolicited command from the secure element; and
executing, at the connectivity device, the unsolicited command to establish communications with an external device.

14. The method of claim 11, further comprising:
receiving, at the processor, an unsolicited command from the secure element; and
sending, from the processor, a response to the unsolicited command to the secure element.

15. The method of claim 11, further comprising:
receiving, at a connectivity device disposed in the mobile device and coupled to the secure element, the transaction request from an external device; and
sending, from the connectivity device, the transaction request to the secure element.

16. The method of claim 11, further comprising:
receiving, by the secure element, the transaction request from a first connectivity device coupled to the secure element;
and establishing, by the secure element, a secure communication channel with a device external to the mobile device using a second connectivity device in response to receiving the transaction request from the first connectivity device,
wherein the first connectivity device and the second connectivity device are configured to communicate using different communications protocols.

17. A non-transient computer readable medium comprising computer readable instructions, which when executed by a secure element coupled to a processor causes the secure element to:
receive a transaction request to execute a transaction;
activate a secure application, residing in the secure element, to execute the transaction in response to the transaction request;
receive sensitive information related to the transaction request;
process, via the secure application, the transaction using the sensitive information while maintaining the sensitive information within the secure element and without exposing the sensitive information to the processor; and
communicate, via the secure application, with an application executing on the processor regarding the secure transaction, wherein the application is excluded from processing the transaction.

18. The non-transient computer readable medium of claim 17, further comprising computer readable instructions, which when executed by the secure element causes the secure element to:
receive the transaction request from the processor; and
send an unsolicited command to a connectivity device.

19. The non-transient computer readable medium of claim 17, further comprising computer readable instructions, which when executed by the secure element causes the secure element to:
receive the transaction request from a connectivity device coupled to the secure element; and
send an unsolicited command to the processor.

20. The non-transient computer readable medium of claim 17, further comprising computer readable instructions, which when executed by the secure element causes the secure element to:
receive the transaction request from a first connectivity device; and
send an unsolicited command to a second connectivity device to establish a secure communication channel with an external device in response to receiving the transaction request from the first connectivity device, wherein the first connectivity device and the second connectivity device are configured to communicate using different communication protocols.

* * * * *